United States Patent
Charlot et al.

(10) Patent No.: US 7,536,387 B2
(45) Date of Patent: May 19, 2009

(54) METHOD FOR INTERFACING APPLICATIONS TO MAINTAIN DATA INTEGRITY

(75) Inventors: Regis Charlot, Lake Bluff, IL (US); Frank Naeymi-Rad, Libertyville, IL (US); Andre Young, Kenosha, WI (US)

(73) Assignee: Intelligent Medical Objects, Inc., Northbrook, IL (US)

( * ) Notice: Subject to any disclaimer, the term of this patent is extended or adjusted under 35 U.S.C. 154(b) by 475 days.

(21) Appl. No.: 10/642,108

(22) Filed: Aug. 15, 2003

(65) Prior Publication Data

US 2005/0038795 A1 Feb. 17, 2005

(51) Int. Cl.
*G06F 17/30* (2006.01)
(52) U.S. Cl. .................. 707/10; 707/104.1; 707/203
(58) Field of Classification Search .............. 705/3, 705/2; 707/10, 104.1, 100, 3, 203; 709/203, 709/219
See application file for complete search history.

(56) References Cited

U.S. PATENT DOCUMENTS

| | | | |
|---|---|---|---|
| 5,897,635 A * | 4/1999 | Torres et al. ............. | 707/10 |
| 6,115,715 A | 9/2000 | Traversat | |
| 6,185,613 B1 * | 2/2001 | Lawson et al. ............ | 709/224 |
| 6,208,974 B1 * | 3/2001 | Campbell et al. .......... | 705/2 |
| 6,517,587 B2 * | 2/2003 | Satyavolu et al. ......... | 715/501.1 |
| 6,675,205 B2 * | 1/2004 | Meadway et al. .......... | 707/10 |
| 6,711,557 B1 * | 3/2004 | Palaniappan ............. | 707/10 |
| 7,080,000 B1 * | 7/2006 | Cambridge ............... | 703/21 |
| 7,143,094 B2 * | 11/2006 | Arroyo et al. ............ | 707/10 |
| 2001/0051880 A1 | 12/2001 | Schurenberg | |
| 2002/0007284 A1 | 1/2002 | Schurenberg | |
| 2003/0191868 A1 * | 10/2003 | Espino ................... | 709/223 |
| 2003/0236683 A1 * | 12/2003 | Henderson et al. ........ | 705/2 |
| 2004/0034550 A1 * | 2/2004 | Menschik et al. ......... | 705/3 |
| 2004/0060044 A1 * | 3/2004 | Das et al. ................ | 717/171 |
| 2004/0083477 A1 * | 4/2004 | Acharya et al. .......... | 718/102 |
| 2004/0122712 A1 * | 6/2004 | Hill et al. ............... | 705/2 |
| 2004/0139222 A1 * | 7/2004 | Slik et al. ............... | 709/217 |

\* cited by examiner

*Primary Examiner*—Charles Rones
*Assistant Examiner*—Rezwanul Mahmood
(74) *Attorney, Agent, or Firm*—Beem Patent Law Firm (57) ABSTRACT

A method for interfacing applications to maintain data integrity. A client service identifies new or changed data in a client application. The data is then posted to a core service in a transaction. Next, the client applications that need updating are determined. For the client applications that need updating a pending transaction directed to those client applications is stored in the queue storage. The client service for one of the client applications that needs updating searches the queue storage for the pending transaction. The client service then updates the client application that needs updating with the new or changed data.

2 Claims, 5 Drawing Sheets

METHOD FOR INTERFACING APPLICATIONS TO MAINTAIN DATA INTEGRITY

BACKGROUND OF THE INVENTION

1. Field of the Invention

The present invention is a method for interfacing a plurality of client applications that utilizes client services and a core service to maintain data integrity across all client applications.

2. Description of the Related Art

Electronic information often is shared by a plurality of systems. When information is created or updated within one system, other systems will have no knowledge of this change, unless the change is manually replicated in all other systems. This type of approach will lead to having the same information duplicated on several systems, with different 'identities', still with no guarantee that the duplication was accurate or even occurred.

Information exchange is highly critical in the case of systems exchanging information within a defined information flow. For example System A might create or update information, parts of it later communicated to system B, and upon response from system B, will eventually communicate all the information to system C for reporting.

Application interfaces define and enforce business flow. In other words, once several applications have been interfaced, it is rather difficult to change how systems are used without losing functionality or causing problems. For example, a new patient could be created using either the Patient Scheduling system or the Billing system. If the operational system was not properly designed to handle how these two systems would be used, it would possibly create confusion.

In the usual approach to application interfaces, all systems establish bi-directional interfaces to one or many systems. The complexity of these interfaces might range from moderately difficult to problematic. This is especially the case with laboratory interfaces which are usually based on the Health Level 7 (HL7) protocol, the standard for exchanging such type of information. An important factor with this approach is how efficient will interfaces connect systems; much quality assurance is required for each interface. Also, as the number of systems grows linearly, the number of interfaces grows exponentially. Finally, in the current approach to application interfaces, if the network connection between the systems disconnects temporarily, updates in one system cannot be communicated to the other systems.

It is desired that an approach to application be developed to limit the complexity of connecting systems that currently exists with bi-directional interfaces. Furthermore, the system should be efficient and assure accuracy across each system.

SUMMARY OF THE INVENTION

A method for interfacing a plurality of client applications, which utilizes client services and a core service, identifies new or changed data in one of the client applications and directs the data to another client application preferably in the order stated. The new or changed data is posted to the core service in a transaction. The client applications that need to be updated with the data are determined. A pending transaction, which is directed to a client application, is stored in a queue storage. The queue storage is searched by a client service for a pending transaction that is directed to a specific client application. The specific client application is updated with the new or changed data by the client service.

In one embodiment, the client service is windows service or any type of thread that runs periodically on a networked client application. Preferably the core service is a web service that is hosted by a web server and consists of system definitions and data publication lists.

In another aspect of the inventive method, the core service may interact with an outside system such as an identification mapping and translation system. The core service may search the queue storage to determine whether the new or changed data was identified due to a previous transaction. Also, the core service may search the queue storage to determine whether one of the pending transactions is a subset of a transaction that is stored in the queue storage. The core service preferably updates the status of the pending transactions in the queue storage.

DETAILED DESCRIPTION OF THE DRAWINGS

Figure 1:
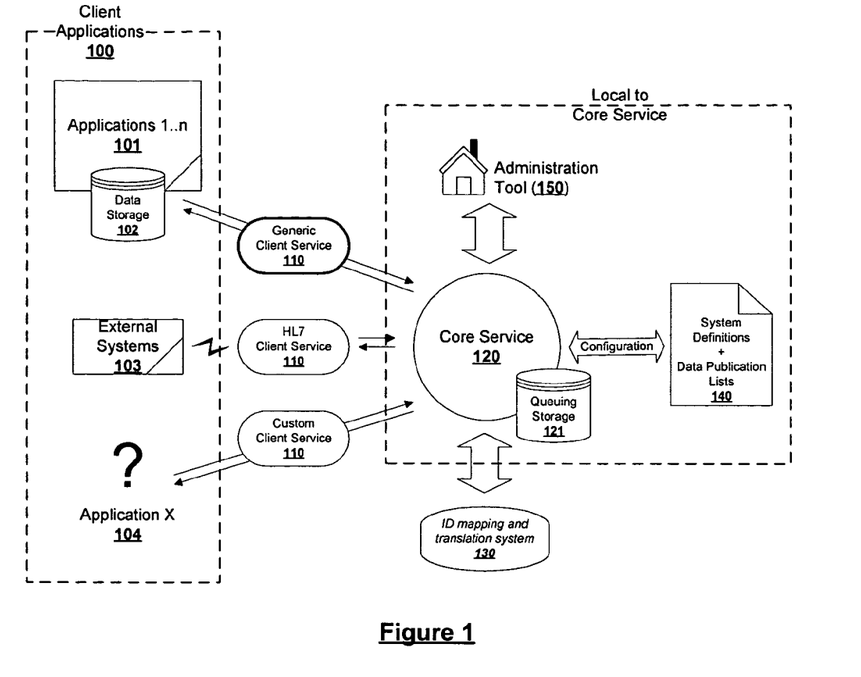
FIG. 1 depicts the layout of the components of the system.

The system is an interface engine that allows a client application 100 to interface with another client applications 100 using a core service 120, and client services 110 that act as bridges from the core service 120 to client applications 100.

This approach to application interfaces considers that application interfaces should not connect to other applications, but rather interface to a core interface system, devoted solely to application interfacing, so that information is then redirected to the appropriate applications. It is not the responsibility of the application interface to know what to communicate to whom, but rather it is the responsibility of the core interface system to gather information, and to communicate all or parts of that information to one of many other systems.

In essence, regular application interfaces are custom-fitted to their particular application, in order to properly extract data from and insert or update data within the application data store. By contrast, for a specific application, the generic client service 110 recognizes new or changed data from the application data store, and will post these creations or changes to the core service 120. In addition, the core service 120 has one or many streams pending for this application: the client service 110 probes for new or updated data, and if present, updates the application data store.

The core service 120 also has the ability to interact with a queuing storage. The queuing storage 121 is used to store and log outgoing core transactions. A client service 110 is able to probe this queuing storage 121 for new data relevant to the client service's application. Furthermore, the queuing storage 121 maintains a record of all transactions posted by the core to prevent data loops between systems. The core service 120 further may interacts with an identification mapping and translation system 130 to perform identity mapping.

With this core-client approach to application interfaces, transaction loops and repeated transactions may hinder the system. To avoid this potential problem, the core service 120, upon processing the data sent from the client service 110, searches the queue storage 121 to determine whether the current transaction is due to a previous transaction. If it is due to a previous transaction, the core service 120 disregards the current transaction to avoid a data loop. Also, the core service, before storing a pending transaction in the queue storage 121, searches the queue storage 121 to determine whether the current transaction is a subset of a transaction already stored in the queue storage 121. If it is a subset, the current transaction had been submitted previously to the core service 120 and the core service 120 will not post the current transaction to the queue storage 121.

The client services 110 preferably are implemented as windows services, while the core service 120 is a web service hosted by a web server. The queuing storage 121 might be hosted by a database. Further, the communications protocol used is XML, which provides a standard, hierarchical setup for messaging between the systems and services.

General Layout

FIG. 1 sets forth the general layout of the components in the data and transaction flow. The main components in this layout are the client applications 100, client services 110, core service 120, queuing storage 121, core configuration 140, administration tool 150 and the ID mapping and translation system 130. The client services 110 act as intermediaries between the client applications 100 and the core service 120. Therefore, all interaction between the core service 120 and the client applications 100 are handled through the client services 110. The core service 120 interacts with the administration tool 150, queuing storage 121 and the ID mapping and translation system 130.

ID Mapping and Translation Method Incorporated by Reference

An example of an ID mapping and translation system is disclosed in the commonly assigned, co-pending patent application Ser. No. 10/642,072, titled Identification Mapping and Translation Method, filed contemporaneously herewith, the disclosure of which is incorporated herein by reference.

A method for mapping and identifying entity information utilizes a computational algorithm and a system that includes a database. Several steps are included in the method preferably in the following order. A client application sends client entity attributes to the system. The system compares the attributes of the client entity with each of the system entities stored in the system database. Based on the results of the comparison, a score is calculated for the relevance between the client entity and each entity stored in the system. To perform this calculation, a multi-membership Bayesian function is used. Once the scores are computed, they are classified into preferably three confidence zones based on predetermined thieshold values. The client attributes are inserted into the system database. These attributes are connected either to an existing system entity or to a new system entity.

The resultant zone can be green, red, or yellow. The green zone indicates a very probable match between a client entity and a known entity and is the high confidence zone. The red zone indicates no probable match with the known entity and is the low confidence zone. The yellow zone indicates that a human decision needs to be made before assigning the client entity a new or existing code and is the indeterminate zone.

In one embodiment, the communications protocol used to send information to and from the system is an XML communications protocol. The multi-membership Bayesian calculation function may utilize positive, negative and neutral contributions to the scores. The client entities and system entities are particularly advantageous in representing people, who tend to have complex characteristics.

Components

Core Service 120

The core service 120 is a web service hosted by a web server that functions as the gateway between all client transactions. The core service 120 consists of a handful of functions used to manage client applications 100 and their data items, receive, post and distribute transactions to other client applications 100 and interface with an ID mapping and translation system 130.

There are four main functions in the core service 120: Register, PushItem, PullItem and Info.

The administration tool 150 uses the Register function to create, edit and delete client applications 100 that transfer data between each other. The Register function requires a XML string as input. The XML string represents a client application 100 and has the following structure:

```
<APPLICATION>
    <CODE></CODE>
    <NAME></NAME>
    <KEY></KEY>
    <INBOUNDSCRIPT></INBOUNDSCRIPT>
    <OUTBOUNDSCRIPT></OUTBOUNDSCRIPT>
    <CONNECTIONSTRING></CONNECTIONSTRING>
    <ITEM>
        <ITEMCODE></ITEMCODE>
        <ITEMNAME></ITEMNAME>
        <FLAG></FLAG>
    </ITEM>
</APPLICATION>
```

Application is the parent node of the application XML string. It has one attribute called Mode. The Mode value determines what the Register function will do with the client application 100. This value can be add, update, or delete.

Code is a child node that contains the unique database-created application code. This value must only be specified if updating or deleting an existing node. If the action requests adding a new node, this value can be left blank.

Name is a child node that contains the name of the application.

Key is a child node that specifies the unique key that is generated by the web service for each client application 100.

Inboundscript is a child node that contains the SQL script used to pull data, which originated from the client service 110, from the queuing storage 121.

Outboundscript is a child node that contains the SQL script used to push data, which is directed to a client service 110, to the queuing storage 121.

Connectionstring is a child node that contains the connection string for the database used to push and pull data from.

Item is the start tag for the data items that will be pushed and pulled from the queuing storage 121. Itemcode specifies the unique database created item code and Itemname specifies the name of the item. Flag determines if an item is a combination of application-inbound, application-outbound, and Identifier. There is no limit to how many items can be in the XML string.

The core service 120 uses the PushItem function to retrieve a transaction from the client service 110. The PushItem function requires two XML strings: Application XML string and Transaction XML string. With this function, the core service 120 deduces which client applications 100 are to receive an application-inbound transaction. For each of the client applications 100 identified, a transaction is added to the queue storage 121. The content of these transactions is determined by the items submitted within the Transaction XML string and also from the identifier translation. The identifier translation is the result of interfacing with the ID mapping and translation system 130. These transactions are pushed to the queue storage 121 and are given a 'pending' state until a client service 110 requests 'pending' transactions.

The client service 110 requests pending transactions and the core uses the PullItem function to retrieve pending transactions for a target client application 100. The PullItem function requires the Application XML string. Once the transaction is pulled from the queue 121, the transaction's state is changed from "pending" to "processed".

The Info function allows a client application 100 to receive information about a specific application 100. It requires the Application XML string as input.

Configuration 140

Figure 7:
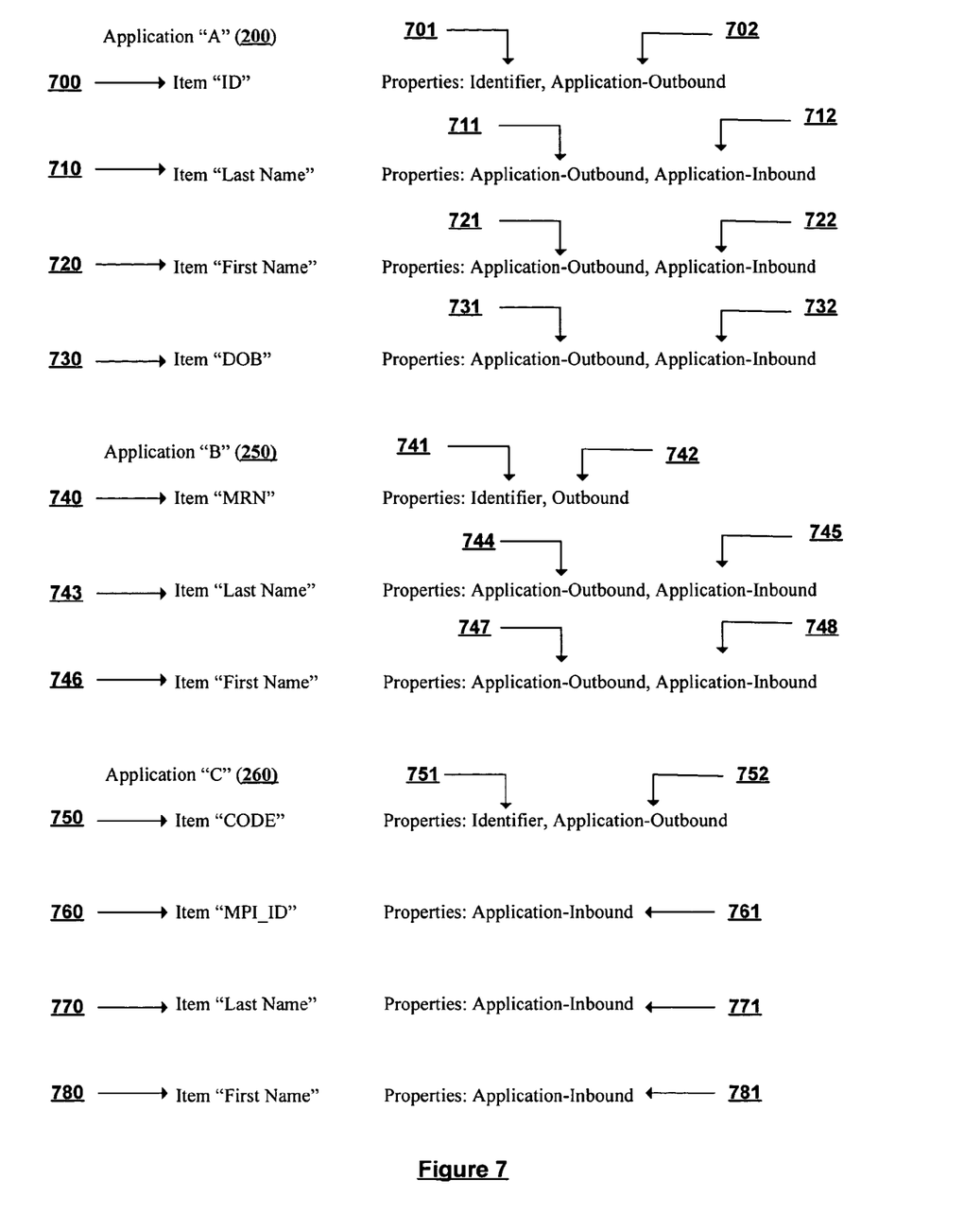
FIG. 7 shows an example core configuration.

The core service 120 is driven by a file XML configuration 140. This configuration 140 is present in the same folder as the core binary. The configuration 140 notably includes the location of the core database back, and the encryption key needed to interact with the administration tool 150. A typical example of configuration file content is:

```
<?xml version="1.0" encoding="utf-8" ?>
<configuration>
    <symmetricKey>KApxmDoM1y03oilUFvd8dwdcEdBwI7jF
    </symmetricKey>
    <ConnectionString>Provider=OraOLEDB.Oracle.1; Persist
Security Info=True; Password=InterfaceAgent; User ID=InterfaceAgent;
Data Source=MyDatabase</ConnectionString>
</configuration>
```

Client Service 110

The client service 110 is a windows service that wakes up every few seconds to communicate with the core service 120 to push and pull new transactions to and from the core service 120. The client service 110 acts as a bridge from the target client application 100 to the core service 120. One single client service 110 might cater several client applications 100, or several client services 110 might jointly cater to a single large client application 100.

Configuration

The client service 110 is driven by a data-driven configuration. This configuration notably includes: the location of the core web service 120, a list of client applications 100 the client service 110 can access, the interval of time between Windows service starts and the number of database records processed every time the client service 110 'wakes up'. For each client application 100 in the list, the configuration specifies the application code and the encryption key required to exchange data. All other necessary application information is requested from the core service 120, prior to push or pull operations. Such information consists of the database connection to the client application 100, the list of application items, and the inbound and outbound scripts.

The local client service XML configuration is present in the same folder as the client binary. This local XML configuration indicates to the client application 100 which application(s) 100 the client service 110 provides interface services to. This configuration only indicates the list of applications 100, with corresponding encryption keys; more information is gathered from the core service 120 when necessary. A typical example of configuration file content is:

```
<?xml version="1.0" encoding="utf-8" ?>
<configuration>
    <InterfaceAgentWS>http://localhost/InterfaceAgent/
    InterfaceAgent.asmx</InterfaceAgentWS>
    <Application Code="4" SymmetricKey=
    "oOPJV422N09b5VtwDLuoegndDOZem8mR" />
    <Application Code="5" SymmetricKey=
    "mnZ10Y7354CW1WRLQk9LUFc6g33fj2AP" />
    <RecordBlockSize>200</RecordBlockSize>
    <Interval>60</Interval>
</configuration>
```

Inbound and Outbound Scripts

Inbound and outbound application scripts drive the behavior of the client service 110. The Pull function uses the inbound script and the Push function uses the outbound script.

Inbound scripts consist mainly of actions to check if such data is already present in the target database and to insert this data into the database or update existing data in the database. An example of an inbound script is:

```
<PUSH>
    <CHECK>select patient_code from patient where
    external_id = '[MRN]'</CHECK>
    <TABLE NAME="PATIENT" />
    <COLUMN NAME="FIRSTNAME" ITEM="FIRST_NAME"/>
    <COLUMN NAME="LASTNAME" ITEM="LAST_NAME"/>
    <COLUMN NAME="EXTERNAL_ID" ITEM="MRN"/>
    <COLUMN NAME="SSN" ITEM="SSN"/>
    <COLUMN NAME="GENDER" ITEM="GENDER"/>
    <COLUMN NAME="MIDDLEINITIAL"
    ITEM="MIDDLE_NAME"/>
    <COLUMN NAME="DOB" ITEM="DOB"/>
    <COLUMN NAME="TAG_SYSTEMUSER" VALUE="1"/>
    <COLUMN NAME="SERVICEACCOUNT_CODE"
    VALUE="1"/>
</PUSH>
```

Outbound scripts consist mainly of actions for querying data that will be packaged as transactions and shipped to the core service 120 and also to update such data as shipped, if the interaction with the core service 120 was successful. An example of an outbound script is:

```
<PULL>
    <SQL>
        select
            PERSON_ID,
            MRN,
            PATIENT_STATUS,
            LAST_NAME,
            FIRST_NAME,
            MIDDLE_NAME,
            DOB,
            SSN,
            ETHNIC_ORIGIN,
            MAIDEN_NAME,
            MOTHERS_MAIDEN_NAME,
            ETHNICITY,
            IDN_EMPI_NO,
            MED_REC_NO_ID,
            FACILITY_ID,
            STATUS
        from
            person
        where
```

-continued

```
        status = 0
     order by
        person_id
   </SQL>
   <SQL>
      update person set status = 1 where MRN = '[MRN]'
   </SQL>
</PULL>
```

Transaction Queue Storage

The queue storage 121 is hosted by a relational database and is used to store transactions.

Administration Tool 150

The administration tool 150 is web-based and allows administration of the configuration of the core service 120 at large. This administration tool 150 is located and hosted in the direct vicinity of the core web service 120.

The administration tool 150 allows for the managing of all the client applications 100 that will transfer data using the core service 120. Applications 100 as well as application items can be added, edited and deleted using the web-based administration tool 150.

Figure 3:
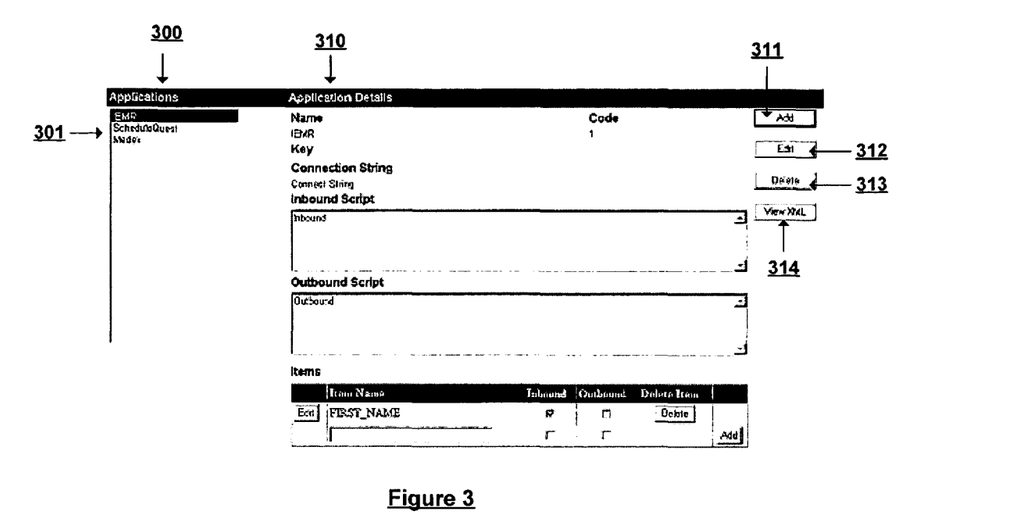
FIG. 3 shows a screen shot of the administration tool site.

FIG. 3 shows the layout of the web-based administrative tool 150. On the left side of the screen, the list 301 of client applications 100 is shown. Selecting a client application 100 on the left side of the screen shows the application details 310 on the rights side of the screen.

Figure 4:
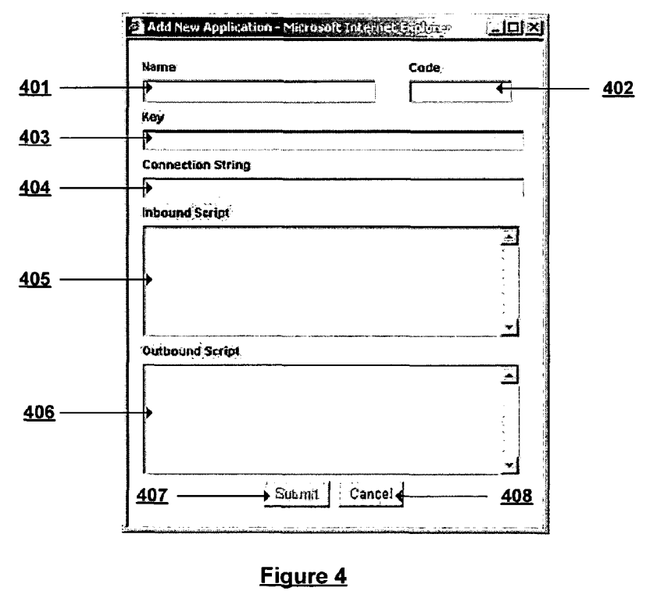
FIG. 4 shows a screen shot of the add application screen for the administration tool site.

Clicking the "add" button 311 on the right of the screen in FIG. 3 will bring up the Add New Application screen in FIG. 4. On this screen both the "Name" 401 and "Connection String" 404 fields are required fields. These two fields must be entered before the new client application 100 can be saved. "Code" 402 and "Key" 403 fields are automatically generated and are read-only.

Clicking the "edit" button 312 on the right side of the screen in FIG. 3, will bring up the Edit Application Screen. This screen is similar to the Add New Application screen in FIG. 4 and previously entered values are shown in the corresponding fields.

Clicking the "delete" button 313 on the right side of the screen will delete the currently selected client application 100 from the database.

Figure 5:
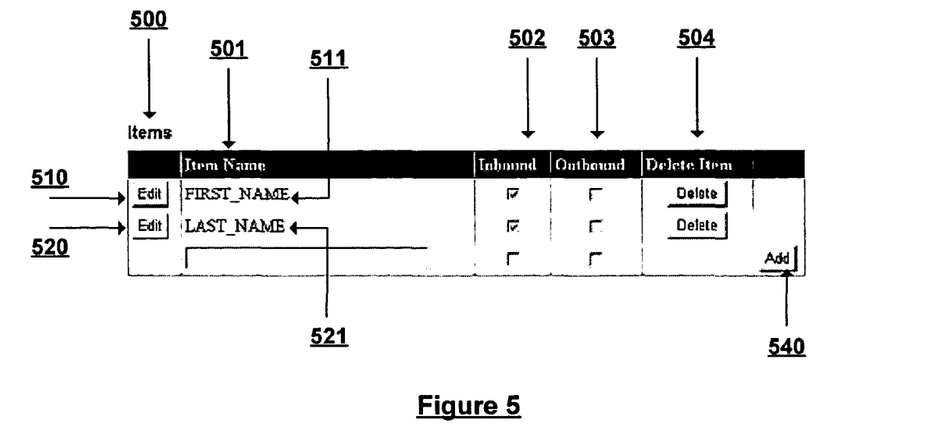
FIG. 5 shows a screen shot of the application items screen for the administration tool site.
Figure 6:
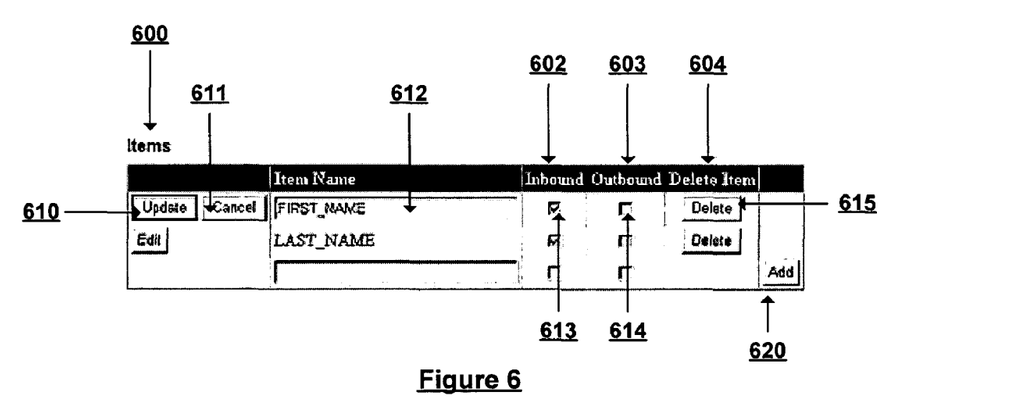
FIG. 6 shows a screen shot for editing application items for the administration tool site.

A list of application items is displayed in the Application Detail pane 500 shown in FIG. 5. Application items 511, 521 are displayed whenever a client application 100 is selected. The item name is shown as well as item attributes such as application-inbound 502, application-outbound 503 or identifier. Clicking the edit button 510, 520 next to each item 511, 521 allows the user to edit each item in place. FIG. 6 shows the result of clicking the edit button 510. The item name label 511 turns into an edit field 612 and the inbound 613, outbound 614 and identifier checkboxes are enabled to allow the user to change the values. Update 610, cancel 611, and delete 615 buttons are also available. The add button 620, if clicked, adds the desired new item to the database.

ID Mapping and Translation System 130

The ID mapping and translation system 130 is a black box to the core service 120 and client services 110. It is an add-on component that provides an essential edge to processing transactions that do require ID mapping and translation.

Database Schema

The database schema consists of two tables that define the application 800 and application items properties 900 as well as two tables that define the queue 1000 and queue error log 1100.

Figure 8:
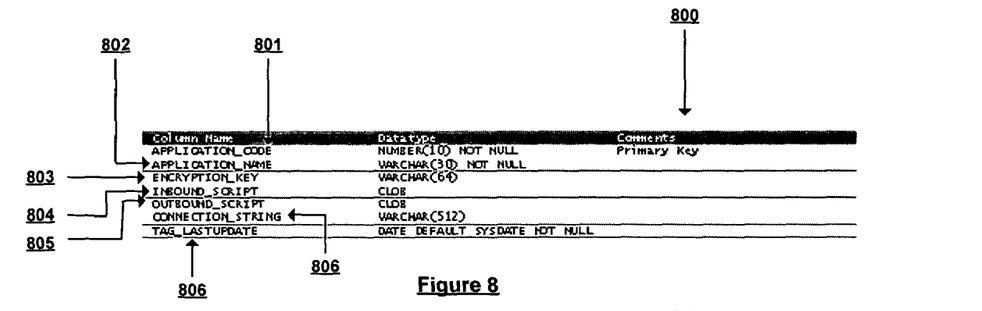
FIGS. 8-11 show the database tables for the system.

The application table 800 defines the name 802 and code 801 of the client application 100, the encryption key 803 used to exchange application-centric data, the inbound 804 and outbound 805 scripts to respectively push and pull to and from the application database, and the database connection string 806 to the application database. This table is shown in FIG. 8.

Figure 9:
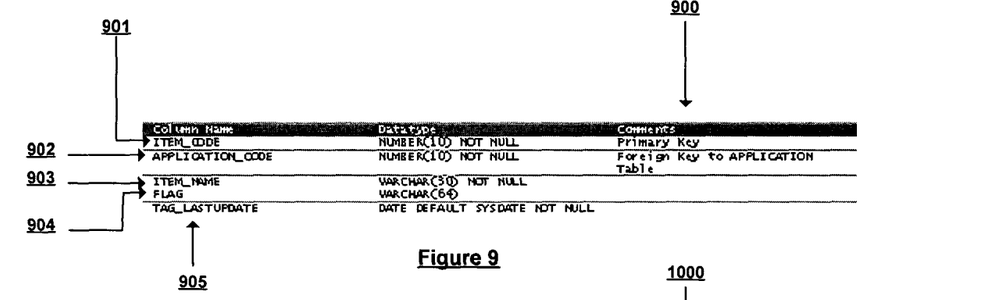

The item table 900 defines all items by client application 100 through a foreign key field 902. Each item is described by an item code 901, and item name 903, and flags 904 describing the behavior of the item. The item table 900 is shown in FIG. 9.

Figure 10:
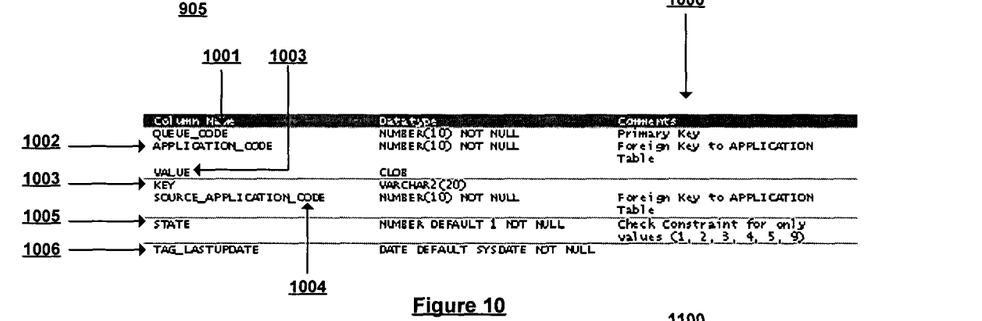

The queue table 1000 is the application transaction repository. Each transaction has a source client application 100, which is the client application 100 that originated the transaction, and a target client application 100, which is the client application 100 that will receive the transaction. A transaction is directed toward an application unique record key 1004 that is stored in the key column. A transaction is also associated with a state 1006. The possible states are 1: Pending, 2: Processed, 3: Target=Source, 4: Loop Transaction, 5: Repeat Transaction, 9: Bad Request. The queue table 1000 is shown in FIG. 10.

Figure 11:
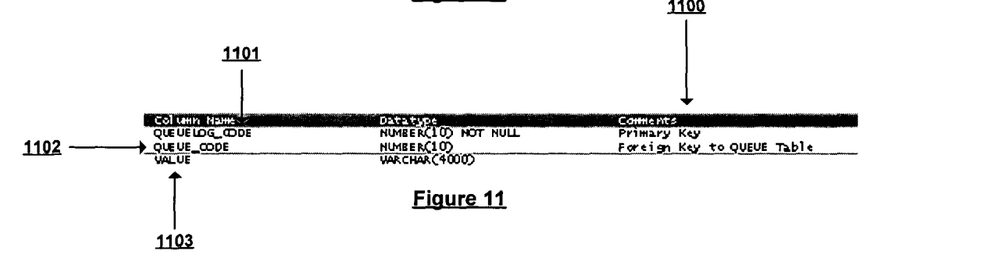

The queue log table 1100 stores the transaction processing errors associated with transactions stored in the queue table 1000. The value column 1103 stores the error description. The queue log table 1100 is shown in FIG. 11.

Transaction Flow

The first step in the transaction flow is an application-outbound transaction 211 from a client application 100 directed towards the core service 120. In one embodiment, shown in FIGS. 2 and 7, the application-outbound transaction 211 can be created due to a new record inserted into application A 200.

A transaction manifests itself as an XML message. For example,

```
<BLOCK KEY="WILVI8801">
   <FIRST_NAME>VIRGINIA</FIRST_NAME>
   <LAST_NAME>WILSON</LAST_NAME>
   <MRN>WILVI8801</MRN>
   <DOB>10/4/1922 12:00:00 AM</DOB>
   <PERSON_ID>33841</PERSON_ID>
   <SSN>353-22-5888</SSN>
</BLOCK>
```

Figure 2:
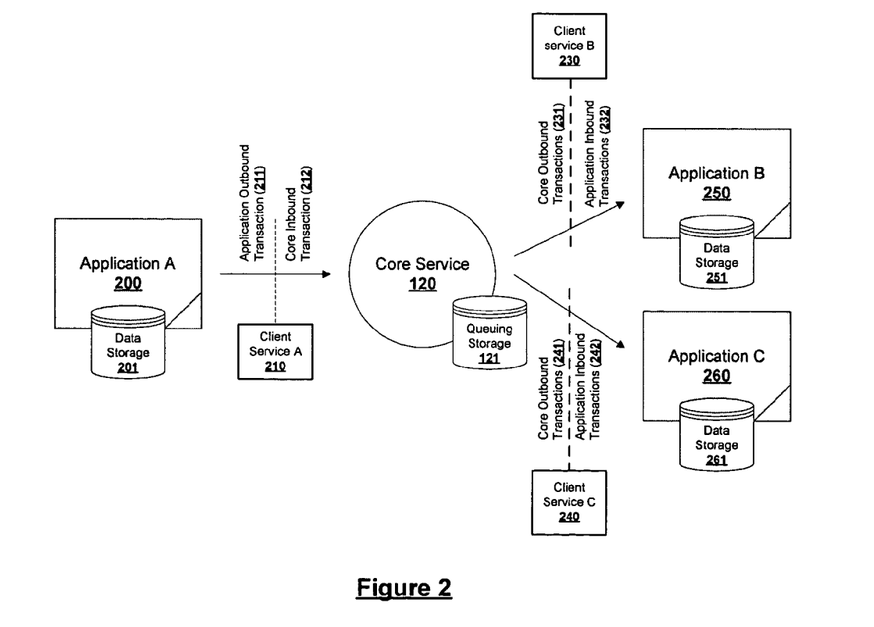
FIG. 2 depicts the layout and the flow of a common transaction.

The <BLOCK> and </BLOCK> tags are the message envelope tags. All other child tags are driven by defined application items, and do correspond to item names. Only items that are flagged as outbound are present into a transaction. Only one possible item is defined as data unique/primary key: the value of this item is repeated into the <BLOCK> tag as the KEY attribute.

Next, the client service 210 messages to the core service 120 with a code, which identifies the client service's application 200, and an encryption key. For example, if the transaction originated in application A 200, the code and encryption key identifies the transaction as resulting from application A 200. This provides access to the information stored in the core service 120 which pertains to the client service's application 200. For example, the client service 210 associated with application A 200 uses the PushItem and PullItem functions as well as SQL statements to refresh or create data within the application data store 201. The client service 210 uses the PushItem function to submit a core-inbound transaction 212 to the core service 120.

The core service 120 parses the core-inbound transaction 212 and determines the application, items and their associated properties and the mode of action specified. For example, a core-inbound transaction 212 from the client service 210 for application A 200 is parsed and the core service 120 determines that the transaction originated in application A 200. Also the items such as ID 700 and Last Name 710 are identified along with their associated properties such as Identifier 701, Application-Outbound 702, 711 and Application-Inbound 712. Furthermore, the mode of action is specified as either add, update or delete.

The core service 120 determines if this change was due to a previous application-inbound transaction by searching the queuing storage 121. If the change was due to a previous application-inbound transaction, the core service 120 does not proceed further in order to avoid a transaction loop.

The core service 120 then scans its list of client applications 100 that connect to it and performs a cross-check based on the item name from the core-inbound transaction 212. If a client application 100 shares a common item name, and the direction property of this item is inbound, the client application 100 is flagged as a target client application 250, 260. For example, based on the core-inbound transaction 212 from application A 200, application B 250 is a target client application 250, 260 since it shares the items 'First Name' 743 and 'Last Name' 746 and the properties include an application-inbound direction 745, 748. Similarly, application C 260 also is flagged as a target client application 250, 260.

For each of the target client applications, a core-outbound transaction 231, 241 is created. Next, the core service 120 scans the core-inbound transaction 212 for items with an identifier property. For example, the 'ID' 700 item is flagged since one of its properties is 'Identifier' 701. The core service 120 then communicates with the ID mapping and translation system 130 to map the identifier from the core-inbound transaction 212 to the identifiers for each of the target client applications. Once these identifiers are determined, they are included in the core-outbound transactions 231, 241. For example, the 'ID' item from application A's 200 client service 210 core-inbound message 212 is sent to the ID mapping and translation system 130. The core service 120 in turn receives the 'MRN' 740 identifier for application B 250 that corresponds to the 'ID' identifier 710 for application A 200. Similarly, the 'Code' identifier 750 for application C 260 is determined by the ID mapping and translation system 130 and sent to the core service 120.

The core-outbound transactions 231, 241 are posted then to the queue storage 121. Before the transactions are stored in the queue storage 121, the core service 120 determines whether the transaction is a subset of a current transaction in the queue storage 121 in order to prevent duplicate transactions. If it is not a subset of a current transaction, the transaction is stored in the queue storage 121 and labeled 'pending.'

Client services 230, 240 for the target client applications 250, 260 routinely check the queue storage 121 for pending transactions directed toward their target client application 250, 260. If a transaction is found, the client service 230, 240 requests that the core service 120 use the PullItem function to request pending transactions for the target client application 250, 260. An application-inbound message 232, 242 is sent then by the client service 230, 240 to its respective target client application 250, 260 using the Pull function.

What is claimed is:

1. A method configured on one or more computers for interfacing a plurality of client applications on one of said computers, utilizing client services and a core service, comprising:

identifying new or changed data in a selected one of said plurality of client applications;

posting said new or changed data in a selected transaction to said core service;

interacting by said core service with an identification mapping and translation system;

determining whether at least a second of said plurality of client applications needs updating with said new or changed data, wherein said at least a second of said plurality of client applications is different from said selected one of said plurality of client applications;

storing in a queue storage pending transactions directed to those of said at least a second of said plurality of client applications determined to need updating, wherein said queue storage comprises a repository for pending transactions;

searching by said core service said queue storage to determine whether said new or changed data in said selected one of said plurality of client applications was due to a previous transaction to avoid a data loop;

searching said queue storage by selected client service for pending transactions directed to a selected client application serviced by said selected client service, wherein said client services act as bridges between said plurality of client applications and said core service: and updating said selected client application serviced by said selected client service with said new or changed data, wherein said interacting step comprises:

sending client entity attributes to said identification mapping and translation system, comparing said client entity attributes with each of a plurality of system entities stored in a system database, calculating a score for the relevance between said client entity and each of said plurality of system entities stored in said system based on the results of said comparing step, classifying said scores into a plurality of confidence zones based on predetermined threshold values, inserting said client attributes into said system database, and connecting said client attributes to an existing system entity or to a new system entity.

2. The method in accordance with claim 1, wherein said plurality of confidence zones comprises a high confidence zone, a low confidence zone and an indeterminate zone.

* * * * *